Aug. 23, 1932.  E. J. DE VILLE  1,873,305
WATER SOFTENING APPARATUS
Original Filed July 17, 1925   6 Sheets-Sheet 3

Fig. 7.

Inventor
Edward J De Ville
By J. C. W. Walker
Attorney

Fig. 11.

Patented Aug. 23, 1932

1,873,305

UNITED STATES PATENT OFFICE

EDWARD J. DE VILLE, OF DAYTON, OHIO, ASSIGNOR TO THE PERMUTIT COMPANY, OF NEW YORK, N. Y., A CORPORATION OF DELAWARE

WATER SOFTENING APPARATUS

Application filed July 17, 1925, Serial No. 44,297. Renewed February 4, 1932.

My invention relates to filters and water softeners, and more particularly to a system of valved conduits for controlling directional flow of water during the different stages of filtering or softening rejuvenation and backwash.

This invention pertains to that type of water filters and softeners, wherein the water is treated by being filtered through a bed of sand or base exchange material, either natural or artificial, having the characteristic of attracting and separating from the water during its filtration, the calcium and magnesium, which give to the raw or untreated water, its "hard" characteristics. After more or less protracted periods of use, such filtration material becomes more or less clogged with calcium and magnesium deposits and loses its softening effect. The filter or softening agent is then rejuvenated by a treatment of salt brine (sodium chloride), which is washed through the filter bed in either the same direction or reverse of the normal flow of water during the softening state of operation. The filter bed of softening material of base exchange substance is thoroughly washed to remove the remaining salt brine, after which the softening power of the material will be found restored for a further period of usefulness. Such water softening apparatus is frequently installed in residences, hotels, laundries, hospitals, hair dressing parlors and other institutions, where they are under the care and attention of persons more or less unskilled and usually more or less uninformed as to the theory and principle of operation. For this reason it is necessary for successful operation that the control devices be reduced to simplest form. While the change of directional flow of water may be achieved by use of separate valves located in the different conduits, the present construction is designed to enable the control of the various stages of operation by the adjustment of a single control handle to different positions of adjustment. There is contemplated a rotary valve having a multiplicity of ports controlled thereby, the ports being arranged in two banks or series, located in parallel planes, certain ports of one bank or series being interconnected with selected ports of the other series, in predetermined pairs, by the adjustment of the valve. In addition to this multiple port valve, drain valves are provided for the main filter or softening tank and also for the salt pot or rejuvenation chamber, which are interconnected with the rotary valve for operation in unison with the adjustment of the valve to predetermined position. This control valve mechanism, together with the system of piping or conduits, through which the flow of water is diverted by the to and fro adjustment of the valve control handle form the subject matter of the present invention.

The object of the invention is to simplify the structure as well as the means and mode of operation of control systems for water softening and filter apparatus, whereby such apparatus will not only be cheapened in construction but will be more efficient, easily controlled, capable of being adjusted and cared for by unskilled persons and unlikely to get out of repair.

A further object of the invention is to provide a construction wherein the various water conduits are so interconnected and valve controlled that the opening and closing of certain water supply conduits necessarily compels the opening and closing of other conduits in proper sequence to insure proper directional flow of the water during all stages of operation.

A further object of the invention is to provide a system which will be more or less automatic in the change of directional flow, under control of a single handle or operating member, movable to different predetermined positions.

With the above primary and other incidental objects in view as will more fully appear in the specification, the invention consists of the features of construction, the parts and combinations thereof, and the mode of operation or their equivalents as hereinafter described and set forth in the claims.

In the accompanying drawings, wherein is shown the preferred, but obviously not necessarily the only forms of embodiment of the invention, In Figs. 5, 6 and 7, there is shown a modification of the construction illustrated in the preceding figures, Fig. 5 being a section on line 3—3 of Fig. 2 and Fig. 6 being a section on line 4—4 of Fig. 2.

Like parts are indicated by similar characters of reference throughout the several views.

In the drawings, 1 indicates a tank, in which is contained the active softening agent or mineral filter bed, through which the water is circulated. This filter bed ordinarily consists of a sub-stratum of coarse gravel, at the bottom of the tank, upon which is superposed a stratum of medium sized gravel, and thereupon a stratum of finer gravel, or the like. Upon this sub-bed is placed the filter bed of base exchange material, which effects the separation of the calcium and magnesium from the water during its passage therethrough. Such base exchange filter bed may comprise natural sand which possesses this water softening characteristic, known upon the market under various commercial names, such as "Naolite Mineral", "Zeolites" and similar terms. Such softening agent may be either the natural sand or artificial materials, the particular character of which forms no part of the present invention. On the front of the tank 1 is disposed the valve conduit system forming the subject matter hereof.

Briefly stated, this system comprises the inlet or supply conduit 2 for the raw or hard water, which discharges through corresponding ports in the main control valve 3, to the downwardly extending conduit 4, which communicates with the interior of the tank 1 at the bottom thereof. The water percolates upwardly through the superposed strata of the filter bed within the tank, where it is subjected to the softening effect of the base exchange agent, the soft water being withdrawn from the tank, at the top thereof, through the conduit 5, which communicates through corresponding intercommunicating ports of the valve 3 with the supply or service conduit 6, through which water is supplied for domestic or other use. This is the normal direction of flow during the water softening stage. When the capability of the softening material comprising the filter bed within the tank has been exhausted, it becomes necessary to rejuvenate this filter bed by circulating salt brine therethrough. To this end there is provided a salt pot 7, having a removable lid 8 clamped thereon by the clamp screw 9, so that the lid may be secured tightly upon the salt pot. Upon a partial rotation of the main control valve 3 to the "salt" position, the inlet or supply conduit 2 communicates through interconnected ports of the valve 3 with the conduit 10, leading to the salt pot, in which has been placed a quantity of common salt (sodium chloride). The brine formed by the dissolved salt passes upward from the salt pot thru the conduit 11, which communicates through interconnected ports of the valve 3, with the conduit 5, communicating with the top of the filter tank 1. The salt brine enters the tank at the top through the conduit 5 and circulates downward through the filteration bed, and escapes from the bottom of the tank through the conduit 4, passing upwardly behind the salt pot 7. This conduit 4 is connected through the control valve with the drain or waste conduit 14. The adjustment of the valve handle, by which the main control valve 3 has been adjusted to "salt" position also effects the opening of the conduit 4 to the waste conduit as hereafter described. After the brine has been circulated through the softening filtration bed, the control valve 3 is reversed to "backwash" position, in which position the inlet or supply conduit 2 is connected through the communicating passages within the valve 3 with the down lead 4, the wash water entering the tank therethrough at the bottom and circulating upward is withdrawn from the tank at the top through the conduit 5, just as in the normal operation and during the softening stage. However, instead of the conduit 5 being interconnected with the service conduit 6, it communicates when the valve is in "backwash" position with the drain or waste pipe 14, through which the wash water is discharged until all trace of the salt solution has been removed. Upon the return of the control valve 3 to its normal or "service" position, the water supply will be circulated upwardly through the tank and thence discharged through the distribution or service conduit 6. The valve 3 has a further "off" position, in which the supply and service conduits 2 and 6 are both shut off. An operative connection from the valve handle when in this "off" position serves to open a drain valve 15, in an outlet passage 16 leading from the bottom of the salt pot 7 to the drain conduit 14, to permit the salt pot to be drained preparatory to the next rejuvenation charge.

Figures 1, 3, 4:
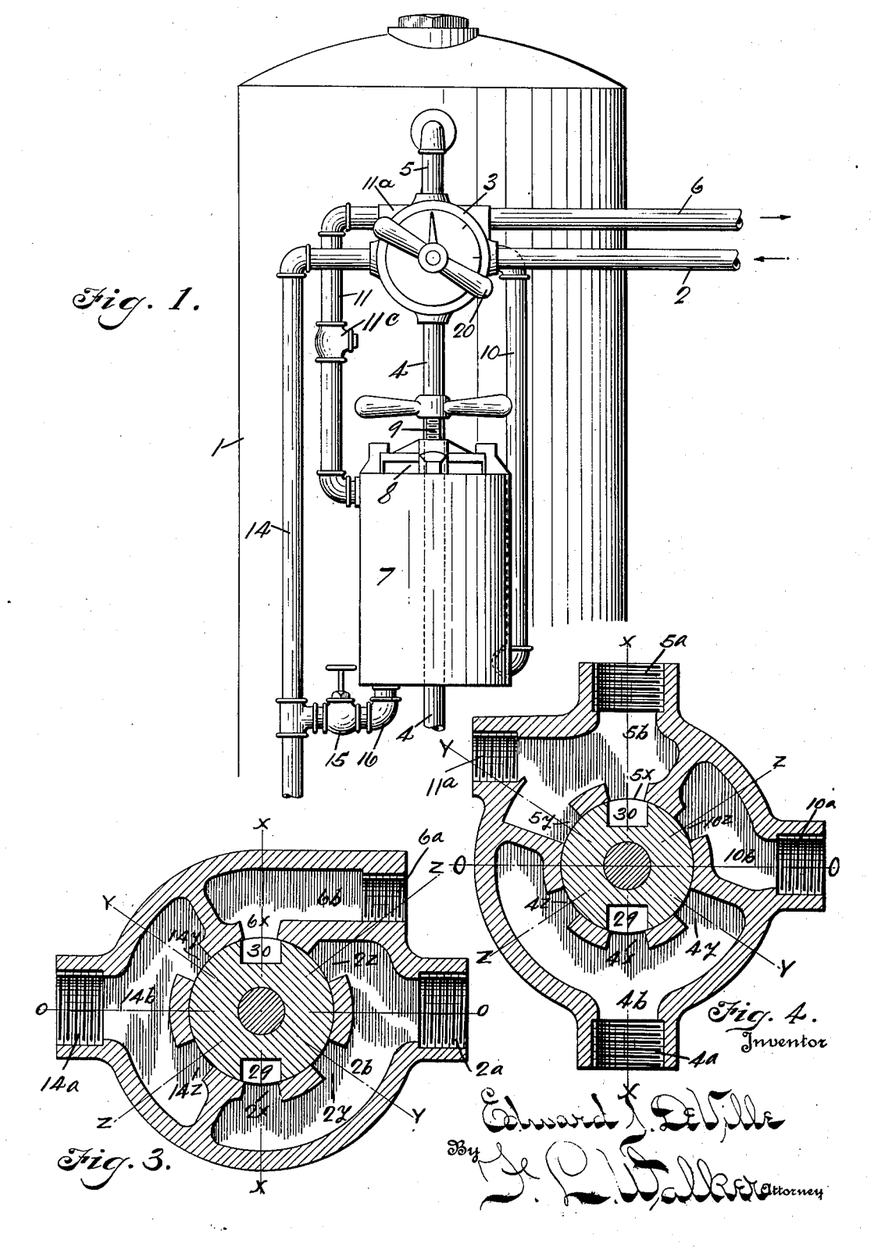
Fig. 1 is a front elevation of a water softening and filter apparatus, to which the present invention has been applied.
Fig. 3 is a transverse sectional view of the control valve upon line 3—3 of Fig. 2.
Fig. 4 is a similar sectional view of the control valve upon line 4—4 of Fig. 2.
Figure 2:
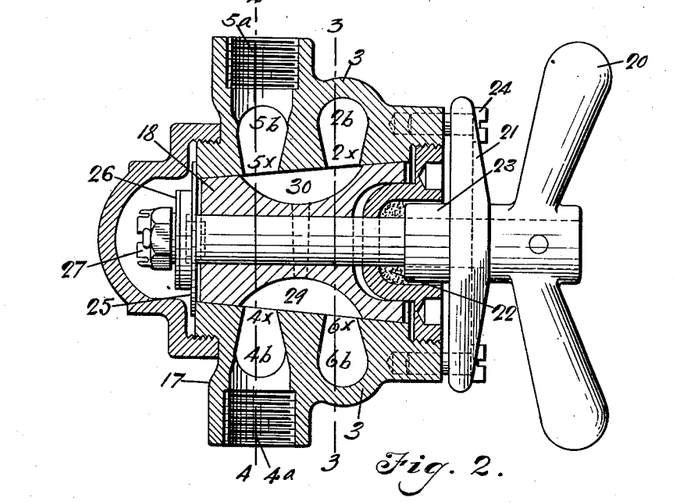
Fig. 2 is a longitudinal sectional view of the assembled rotary control valve.

While various forms of control valves and operative connections may be employed to effect the diversion of the water flow during the several stages of operation before described, the main control valve 3 is preferably of the rotary type, as is illustrated in Figs. 2, 3 and 4. This valve structure consists of a housing or shell 17, having therein a tapered bore to receive the rotary tapered plug or barrel 18. This plug or barrel 18 is secured upon a shaft 19, carrying at its outer end a handle 20 by which the valve plug or barrel may be rotated. Secured in the end of the shell or housing, is a head 21, forming a packing box or chamber 22, to receive a body of packing compressed by the gland 23, adjusted by means of screws 24. At the opposite end of the valve, the shaft or stem 19 carries a disc washer or collar 25, bearing upon the housing 17, and on which in turn bears a resilience collar or washer 26 of rubber, placed under compression by a nut 27. Obviously, a helical spring may be substituted for the compressible collar 26. The valve housing 17 is provided with a number of ports and communicating chambers within the valve housing, which for convenience will be identified by the same reference characters as the respective conduits leading thereto, before mentioned, to which will be added the letter exponents "$a$" for the ports and "$b$" for the chambers. These ports and chambers are arranged in two series, located adjacently in parallel planes.

In the forward plane 3—3, there are located three orifices $2^a$, $6^a$ and $14^a$, connecting the inlet conduit 2, service conduit 6 and waste conduit 14, with the valve chambers $2^b$, $6^b$ and $14^b$ respectively. In the second or rearward plane 4—4, there are located four orifices $4^a$, $5^a$ and $10^a$ and $11^a$, connecting the corresponding tank bottom conduit 4, tank top conduit 5 and salt pot conduit 10, with the appropriate valve chambers $4^b$, $5^b$, $10^b$, respectively. The return brine conduit 11 is connected through the orifice $11^a$ directly with the chamber $5^b$. The rotary valve plug or barrel 18 has therein two bypass ports 29 and 30, located at diametrically opposite points, each serving to connect a valve chamber of the series 3—3 with a valve chamber of the series 4—4. The rotary valve barrel 18 has three operative positions of adjustment, indicated for identification as $x—x$, $y—y$ and $z—z$, and in addition has a cut-off position, indicated at $o—o$, in Figs. 3 and 4. Because of the interconnection of the valve chambers of one series alternately with different chambers of the second series in different operative positions of the valve, it will be noted that certain of the chambers shown have multiple ports, with any one of which the by-pass port of the rotary plug or barrel may be registered. In the normal or service position, the bypass ports 29 and 30 are disposed upon the vertical diameter as shown in the drawings, Figs. 2 and 3, in which the by-pass ports 29 communicating through the auxiliary port $2^x$, with the inlet or supply chamber $2^b$, interconnects the supply conduit 2 leading thereto, through such bypass port 29 with the chamber $4^b$ of Fig. 3, with which the bypass port 29 communicates through the auxiliary port $4^x$, the water entering the chamber $2^b$ through the inlet conduit 2 passes through the bypass port 29 to the chamber $4^b$, and thence through the conduit 4 to the bottom of the tank. After filtering upward through the body of softening material, the water leaves the tank through the conduit 5, which communicates through the port $5^a$, with the chamber $5^b$ (Fig. 4). This chamber $5^b$ being in communication through the auxiliary port $5^x$ and bypass port 30, thence through the port $6^x$ with the chamber $6^b$, the softened water passes to the distribution conduit 6.

Upon necessity for rejuvenation, the rotary plug or valve barrel 18 is turned through a partial rotation until the bypass ports 29 and 30 are disposed upon the diameter $z—z$. The port 30 of the valve barrel then registers with the auxiliary ports $2^z$ and $10^z$, while the bypass port 29 registers with the auxiliary ports $4^z$ and $14^z$. As before described, this is the "salt" position, in which the salt pot 7 is connected in series with the filter tank 1. The water supply entering through the conduit 2 into the chamber $2^b$, passes thence through the registering ports $2^z$, 30 and $10^z$, into the chamber $10^b$, which is connected through the conduit 10 with the salt pot, through which the water passes dissolving the salt content into brine. This brine passes from the salt port 7 through the conduit 11, entering directly into the chamber $5^b$, which communicates through the conduit 5 with the top of the tank 1. To prevent back pressure of the water into the salt pot during the ordinary service period of operation, a check valve $11^c$ may be inserted in the conduit 11. However, its omission is immaterial as the port $10^z$ is always closed except when the valve is in "salt" position. The brine thus introduced into the tank filters downward through the body of water softening material, and emerges from the bottom of the tank through the conduit 4 to the chamber $4^b$ which as before stated is in communication through the bypass 29 and ports $4^z$ and $14^z$ with the waste chamber 14 and thence to the waste conduit 14.

When the circulation of the brine has been completed, the position of the control valve 3 is reversed to the "rewash" position in which the bypass ports 29 and 30 aline upon the diameter $y$—$y$. In this position the supply chamber $2^b$ communicates through the auxiliary port $2^y$ and bypass port 29 with the auxiliary port $4^y$ leading to the chamber $4^b$, from which the water passes through the conduit 4 to the bottom of the tank and thence upward through the filter bed of water softening material within the tank 1, and passes out of the tank from the top thereof through the conduit 5, into the valve chamber $5^b$. This circuit of water thus far is the same as for normal operation or service. However, in this rewash or $y$—$y$ position of the valve, the chamber $5^b$ communicates through the auxiliary port $5^y$, bypass port 30 and auxiliary port $14^y$ with the chamber $14^b$, with which the drain or waste conduit 14 communicates. Thus the rewash water is turned into the sewer or other waste outlet until all trace of the salt solution has been removed. Thereupon the valve is returned to its normal service position in which the bypass ports 29 and 30 are shown in the drawings positioned upon the diameter $x$—$x$. The raw or hard water then again enters through the valve passing thence through the down conduit 4 to the tank and upwardly through the tank where it is subjected to the softening effect of the filter bed and is discharged through the conduit 5 and thence from the main valve 3 through the outlet distribution conduit 6.

For purpose of inspection, repairs or replacement of parts, all of the ports of the main control valve 3 including the supply or inlet port and the outlet or distribution port, may be closed by turning the valve plug or barrel 18 to the "off" position, wherein the bypass ports 29 and 30 are alined upon the transverse diameter O—O. This adjustment closes all of the conduits of the system.

Figure 5:
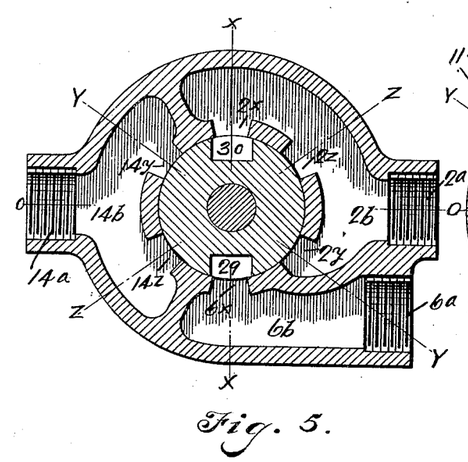
Figure 6:
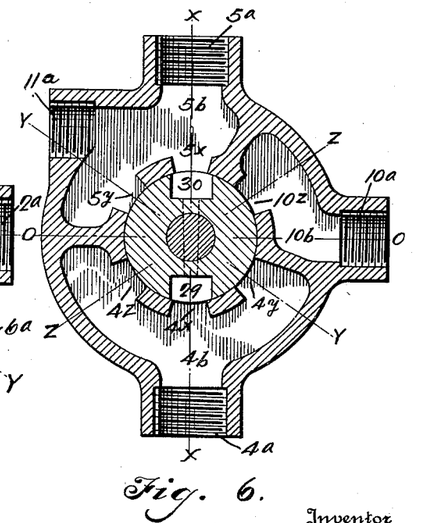
Figure 7:
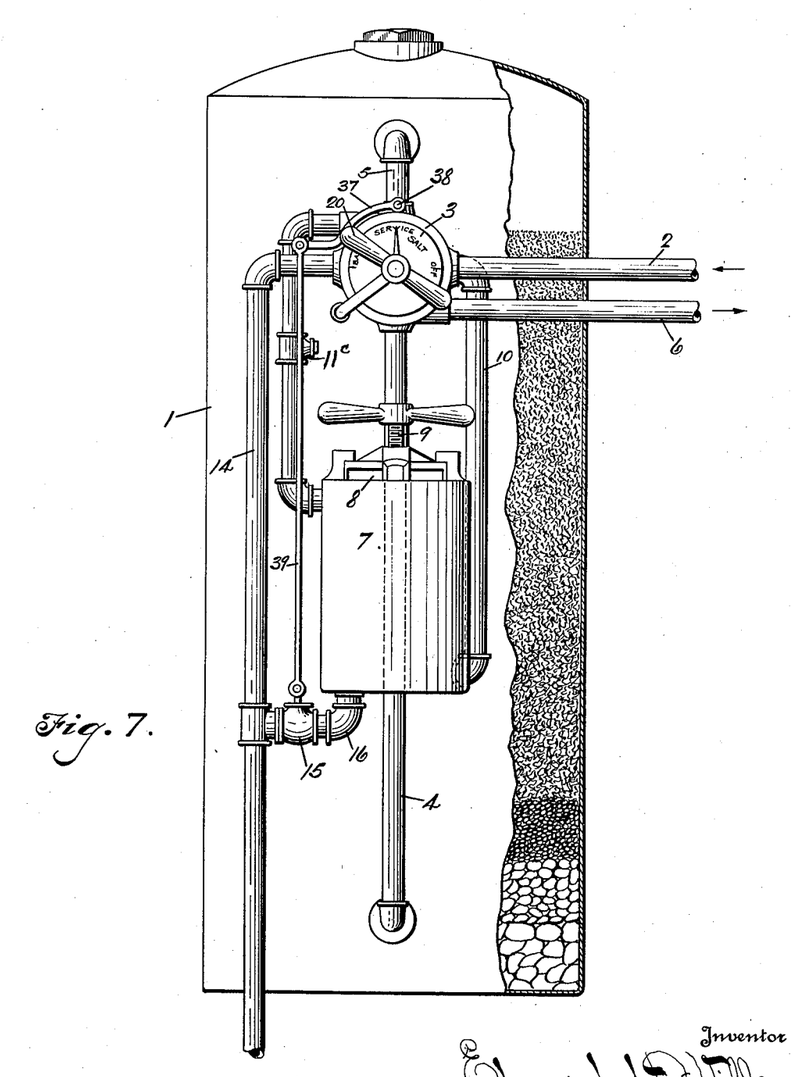
Fig. 7 is a front elevation of the assembled apparatus, similar to Fig. 1, but illustrating the modified conduit system.
Figure 8:
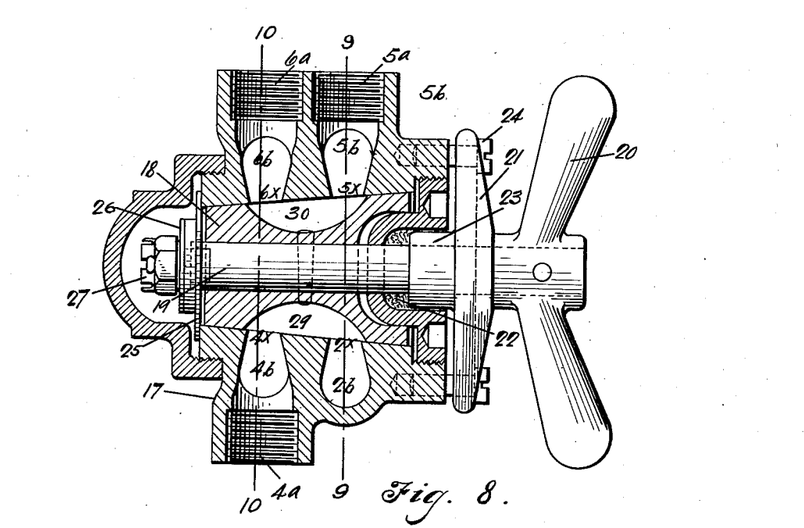
Fig. 8 is a longitudinal sectional view and Figs. 9 and 10 transverse sectional views on line 9—9 and 10—10 of Fig. 8, illustrating a modified arrangement of the control valve chambers and connections.

While the apparatus heretofore described has been found to be quite efficient and desirable, there is illustrated in Figs. 5 to 7, (sheets 2 and 3) a modified construction wherein the direction of normal flow is reversed.

In this modified form of apparatus, the normal operation and direction of flow of water is the reverse of that before described. That is to say, the raw or untreated water entering the supply chamber $2^b$ passes thence through the port 30 to the chamber $5^b$, and thence through the conduit 5 to the top of the tank. After filtering downward through the filter bed within the tank, the treated water passes from the tank through the conduit 4 to the chamber $4^b$, which communicates through the auxiliary port $4^x$ and bypass port 29, and auxiliary port $6^x$ into the outlet or distribution chamber $6^b$, communicating with the distribution conduit. In this instance, the chamber $6^b$ is at the bottom of the valve.

Upon turning the handle 20 to the "salt" position, in which the by-pass ports 29 and 30 are positioned upon the line $z$—$z$, the supply chamber $2^b$ is connected through the registering ports $2^z$, 30 and $10^z$ with the chamber $10^b$ from which the water passes through the conduit 10 to the salt pot 7. As in the construction before described, the water passing from the salt pot 7 through the conduit 11 enters directly into the chamber $5^b$. The salt brine from the pot 7 entering the chamber $5^b$ passes directly through the conduit 5 leading to the top of the tank. The salt brine filters downwardly through the filter bed within the tank, emerging from the tank through the conduit 4, which leads upward to the chamber $4^b$ (Fig. 6). This chamber during the "salt" stage of operation communicates through the registering ports $4^z$, 29, and $14^z$ with chamber $14^b$, from which the waste or drain conduit 14 leads to the sewer.

Upon reversal of the control valve to the "rewash" position indicated as the position $y$—$y$, the water from the source of supply enters the chamber $2^b$, passing thence through the registering ports $2^y$, 29 and $4^y$ into the chamber $4^b$, from which it passes downward from the conduit 4, and filters upward through the filter bed within the tank washing from the filter bed, any remaining salt brine. This rewashing water passing from the top of the tank through the conduit 5, enters the chamber $5^b$, which during the rewash stage is in communication through the ports $5^y$, 30 and $14^y$, with the waste or drain chamber 14 from which leads the waste conduit 14. Thus the raw water filtered upward through the tank during the initial operation following regeneration or rejuvenation of the filter bed, is discharged through the chamber $14^b$, and waste conduit 14, into the sewer or other disposal outlet until all trace of salt brine is removed. The control valve is then returned to the operating position $x$—$x$ in which the service operation previously described is resumed.

Figure 9:
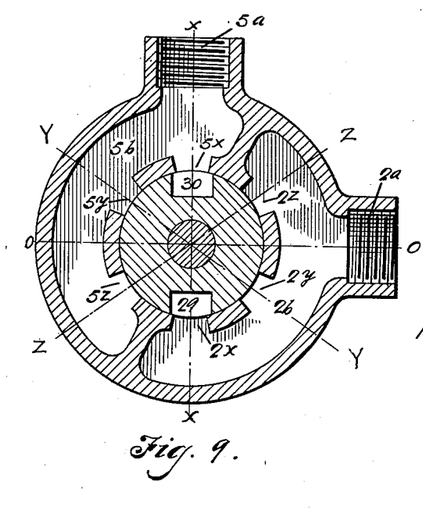
Figure 10:
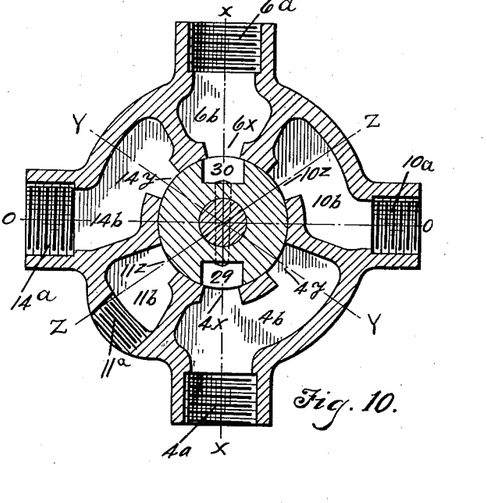
Figure 11:
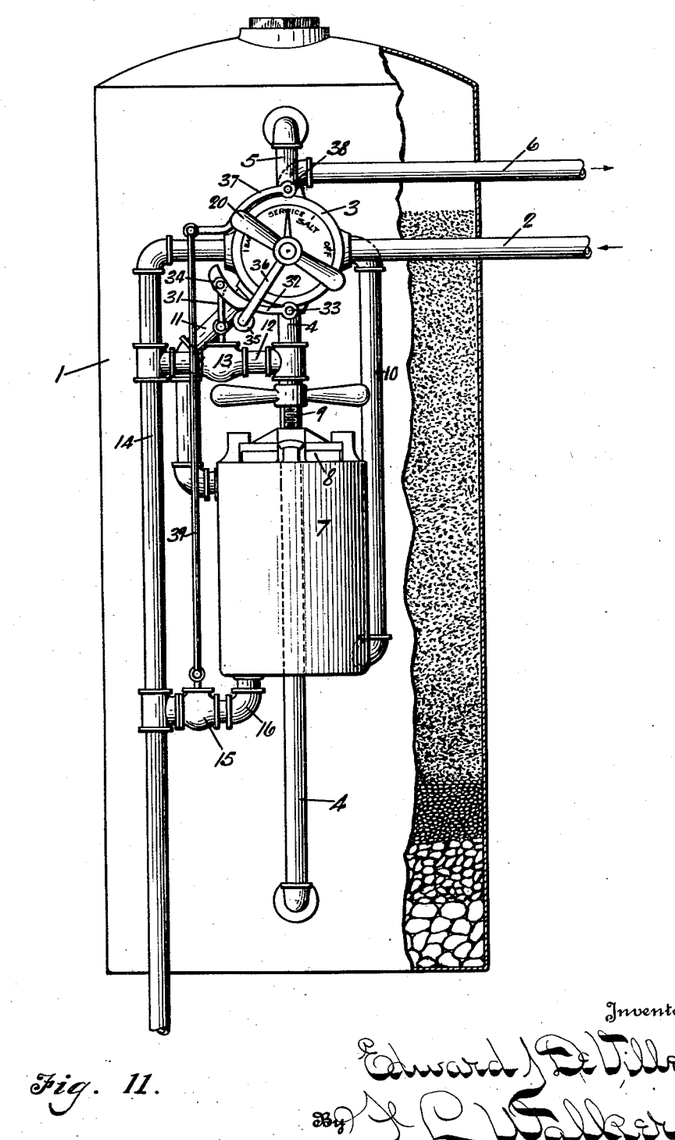
Fig. 11 is a front elevation illustrating a modified arrangement of the sundry conduits and auxiliary valve operating means.

The modified construction shown in Figs. 8 to 11 inclusive is quite similar in general operation to that heretofore described. It differs primarily in the arrangement of the valve chambers and the use of automatically operated auxiliary valves in the conduit system. Referring to Figs. 8 to 11 inclusive, the construction and operation is as follows:

In the forward plane 9—9, there are located the ports $2^a$ and $5^a$, connecting the conduits 2 and 5 with the valve chambers $2^b$ and $5^b$. In the second or rearward plane 10—10, there are located five ports $4^a$, $6^a$, $10^a$, $11^a$ and $14^a$, connecting the corresponding conduits 4, 6, 10, 11 and 14, with the appropriate valve chambers $4^b$, $6^b$, $10^b$, $11^b$ and $14^b$, respectively. The rotary valve plug or barrel 18 has therein two bypass ports 29 and 30, located at diametrically opposite points, each serving to connect a valve chamber of the series 9—9 with a valve chamber of the series 10—10. Inasmuch as there are but two chambers $2^b$ and $5^b$, in the plane 3—3, it necessarily follows that in all operative positions of the valve plug or barrel 18, these chambers are always in communication with one or another of the valve chambers located in the plane 4—4 as shown in Fig. 10. The rotary valve barrel 18 has three operative positions of adjustment, indicated for identification as $x$—$x$, $y$—$y$ and $z$—$z$, and in addition has a cut-off position, indicated at $o$—$o$, in Figs. 9 and 10. Because of the connection of the primary valve chambers with some one or another of the chambers of the second series in each operative position of the valve, it will be noted in Fig. 9 that each of the chambers shown therein have three auxiliary ports, with any one of which the bypass port of the rotary plug or barrel may be registered. In the normal or service position, the bypass ports 29 and 30 are disposed upon the vertical diameter as shown in the drawings, Figs. 9 and 10, in which the bypass port 29, communicating through the auxiliary port $2^x$, with the inlet or supply chamber $2^b$, interconnects the supply conduit 2 leading thereto, through such bypass port 29 with the chamber $4^b$ of Fig. 10, with which the bypass port 29 communicates through the auxiliary port $4^x$. The water entering the chamber $2^b$ through the inlet conduit 2 passes through the bypass port 29 to the chamber $4^b$, and thence through the conduit 4 to the bottom of the tank. After filtering upward through the body of softening material, the water leaves the tank through the conduit 5, which communicates through the port $5^a$ with the chamber $5^b$ (Fig. 9). This chamber $5^b$ being in communication through the auxiliary port $5^x$ and bypass port 30, thence through the port $6^x$, with the chamber $6^b$, the softened water passes to the distribution conduit 6.

Upon necessity for rejuvenation, the rotary plug or valve barrel 18 is turned through a partial rotation until the bypass ports 29 and 30 are disposed upon the diameter $z$—$z$. The port 30 of the valve barrel then registers with the auxiliary ports $2^z$ and $10^z$, while the bypass port 29 registers with the auxiliary ports $5^z$ and $11^z$. As before described, this is the "salt" position, in which the salt pot 7 is connected in series with the filter tank 1. The water supply entering through the conduit 2 into the chamber $2^b$, passes thence through the registering ports $2^z$, 30 and $10^z$, into the chamber $10^b$, which is connected through the conduit 10 with the salt pot, through which the water passes dissolving the salt content into brine. This brine passes from the salt pot 7 through the conduit 11, entering the chamber $11^b$, from which it passes through the auxiliary port $11^z$ and bypass ports 29, and thence through the auxiliary port $5^z$, into the chamber $5^b$ which communicates through the conduit 5 with the top of the tank 1. The brine thus introduced into the tank filters downward through the body of water softening material and emerges from the bottom of the tank through the conduit 4, passing thence through a branch conduit 12, to the drain outlet 14.

In the branch conduit 12 is a cut-off valve 13, which is of the ordinary spring closure type. The stem of the valve 13 is connected by a link 31, with a rock arm 32, pivoted at 33 on the main control valve housing. This rock arm 32 is provided with a cam surface 34 normally projecting into the path of movement of a roller 35 carried upon radially disposed arm 36, projecting from the valve operating handle 20. As the valve handle 20 is turned to register the bypass port 29—30 in the $z$—$z$ position, or "salt" position, the roller 35 upon the arm 36 engages the cam surface 34 and oscillates the rock arm 32 upwardly, thereby exerting a pulling effort upon the link 31, to open the cut-off valve 13. This permits the discharge of the brine after it has passed through the tank to the conduit 4, thence into the waste or drain conduit 14.

When the circulation of the brine has been completed, the position of the control valve 3 is reversed to the "rewash" position in which the bypass ports 29 and 30 aline upon the diameter $y$—$y$. In this position the supply chamber $2^b$ communicates through the auxiliary port $2^y$ and, bypass port 29 with the auxiliary port $4^y$ leading to the chamber $4^b$, from which the water passes through the conduit 4 to the bottom of the tank and thence upward through the filter bed of water softening material within the tank 1, and passes out of the tank from the top thereof, through the conduit 5 into the valve chamber $5^b$. This circuit of water thus far is the same as for normal operation or service. However, in this rewash or $y$—$y$ position of the valve, the chamber $5^b$ communicates through the auxiliary port $5^y$, bypass port 30 and auxiliary port $14^y$ with the chamber $14^b$, with which the drain or waste conduit communicates. Thus the rewash water is turned into the sewer or other waste outlet until all trace of the salt solution has been removed. Thereupon the valve is returned to its normal service position in which the bypass ports 29 and 30 are shown in the drawings positioned upon the diameter $x$—$x$. This raw or hard water then again enters through the valve passing thence through the down conduit 4 to the tank and upwardly through the tank where it is subjected to the softening effect of the filter bed and is discharged through the conduit 5 and thence from the main valve 3 through the outlet distribution conduit 6.

For the purpose of inspection, repairs or replacement of parts, all of the ports of the main control valve 3 including the supply or inlet port and the outlet or distribution port, may be closed by turning the valve plug or barrel 18 to the "off" position, wherein the bypass ports 29 and 30 are alined upon the transverse diameter O—O. This adjustment closes all of the conduits of the system. In addition thereto, when moved to this off position, the roller 35 carried by the radial arm 36 upon the handle 20 passes beyond the cam face 34 of the rock arm 32 and engages with a second rock arm 37, pivoted at 38 upon the main valve 33. This rock arm 37 is connected by a link or cable 39, with the stem of a second spring actuated cut-off valve 15, in the drain outlet 16 from the salt pot 7 before described. The engagement of the roller 35 with the rock arm elevates the arm and exerts a pulling effort upon the cable or link 39 to open such drain valve 15.

Figures 12, 13, 14:
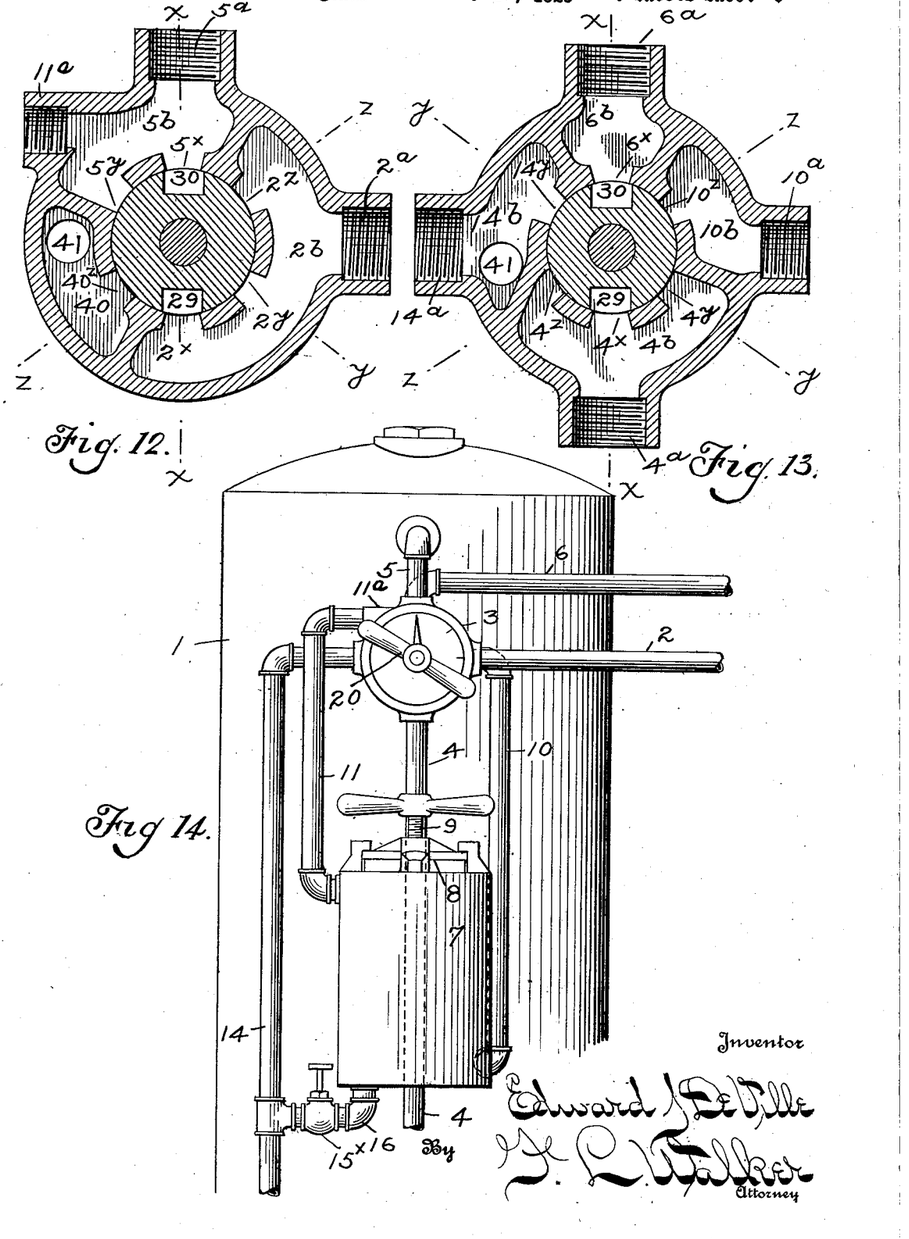
Figs. 12 and 13 are transverse sectional views also on lines 9—9 and 10—10 of Fig. 8, illustrating a further modification.
Fig. 14 is a front elevation of an assembled filter embodying the valve connections of Figs. 12 and 13.

In the modified form of apparatus illustrated in Figs. 12, 13 and 14, the normal operation and direction of flow of water is the same as before described. That is to say, the raw or untreated water entering the supply chamber $2^b$ passes thence through the port 29 to the chamber $4^b$, and thence through the conduit 4 to the bottom of the tank. After filtering upward through the filter bed within the tank, the treated water passes from the tank through the conduit 5 to the chamber $5^b$, which communicates through the auxiliary port $5^x$ and bypass port 30, and auxiliary port $6^x$ into the outlet or distribution chamber $6^b$, communicating with the distribution conduit.

Upon turning the handle 20 to the "salt" position in which the by-pass ports 29 and 30 are positioned upon the line $z$—$z$, the supply chamber $2^b$ is connected through the registering ports $2^z$, 30 and $10^z$ with the chamber $10^b$ from which the water passes through the conduit 10 to the salt pot 7. Whereas in the construction last described, the water passing from the salt pot 7 through the conduit 11, enters an auxiliary chamber $11^b$, from which it passed through the port 29 to the chamber $5^b$, in the present construction, the conduit 11, leading from the salt pot 7 communicates directly with the chamber $5^b$, as in the form first described, thus eliminating the necessity for the intermediate chamber $11^b$. The salt brine from the pot 7 entering the chamber $5^b$ through the inlet connection $11^a$ shown at the upper left in Fig. 12 passes directly through the conduit 5 leading to the top of the tank. The salt brine filters downwardly through the filter bed within the tank, emerging from the tank through the conduit 4, which leads upward to the chamber $4^b$ (Fig. 13), which in this "salt" stage of operation communicates through the registering ports $4^z$, 29, and $40^z$, with chamber 40, which is in constant communication through a permanent opening 41, with the chamber $14^b$, from which the waste or drain conduit 14 leads to the sewer.

Upon reversal of the control valve to the "rewash" position indicated as the position $y$—$y$, the water from the source of supply enters the chamber $2^b$, passing thence through the registering ports $2^y$, 29 and $4^y$ into the chamber $4^b$, from which it passes downward through the conduit 4, and filters upward through the filter bed within the tank washing from the filter bed, any remaining salt brine. This rewashing water passing from the top of the tank through the conduit 5, enters the chamber $5^b$, which during the rewash stage is in communication through the ports $5^y$, 30 and $14^y$, with the waste or drain chamber 14 from which leads the waste conduit 14. Thus the raw water filtered upward through the tank during the initial operation following regeneration or rejuvenation of the filter bed, is discharged through the chamber $14^b$ and waste conduit 14, into the sewer or other disposal outlet until all trace of salt brine is removed. The control valve is then returned to the operating position $x$—$x$ in which the normal operation previously described is resumed. In lieu of the automatic valve 15, a hand operated valve $15^x$ is provided in the drain outlet 16 from the bottom of the salt pot, in order that the salt pot may be drained preparatory to recharging. (In the preferred construction last described, the operation and results are substantially the same, as previously described, the primary difference being the elimination of the valve 13, and the control of the rewash directly by the main valve.

The distribution system described affords a simple and effective method of controlling the directional flow of water by means of a single operating handle, the adjustment of which is within the ability of any unskilled person, even though without knowledge of the theory and principle of operation. Likewise the distribution system including the conduit connections and valves described, comprises a compact unitary structure, which may be completely assembled upon the tank at the place of manufacture, thus insuring the proper connection being made and materially reducing the cost of installation.

From the above description it will be apparent that there is thus provided a device of the character described, possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprises the preferred mode of several forms of putting the invention into effect and the invention, therefore, is claimed in any of its forms or modifications within the legitimate and valid scope of the appended claims.

Having thus described my invention, I claim:

1. In a system of the character described, wherein a supply conduit is to be connected through a main tank with a service conduit and with a waste conduit alternately and wherein an auxiliary tank is to be intermittently connected in series with the main tank, a control valve common to said conduits and tanks, which in different positions of adjustment directs the water flow from the supply conduit thru the tank alternately to the service and waste conduits and reversely through the main and auxiliary tanks in series to the waste conduits, said valve being adapted in a further position of adjustment to simultaneously close the several conduits and tanks against intercommunication, and a valved communicating passage between the bottom of the auxiliary tank and the waste conduit opened when the common control valve is in closed position.

2. In a system of the character described, wherein a supply conduit is to be connected through a main tank alternately with a service conduit and a waste conduit and intermittently connected through an auxiliary tank and said main tank in series with the waste conduit, a control valve common to said conduits and tanks, which in different positions of adjustment directs the water flow from the supply conduit thru the tank alternately to the service and waste conduits and reversely thru the main and auxiliary tanks in series to the waste conduit, said valve being adapted in a further position of adjustment to simultaneously close the several conduits and tanks against intercommunication, and a valved communicating passage between the bottom of the main tank and the waste conduit opened when the common valve is in position connecting the main and auxiliary tanks in series.

3. In a system of the character described, a main tank and an auxiliary tank, a supply conduit, a service conduit and a drain conduit, valve means controlling said conduits, valve actuating means therefor operable to successive positions for operatively connecting the supply conduit through the main tank to the service conduit and to the drain conduit independently of the auxiliary tank, and for connecting the supply conduit through both the main and auxiliary tanks to the drain conduit, a valve connecting the auxiliary tank to the drain conduit independent of the main tank, operatively connected with the valve actuating means and opened by further adjustment of the said valve actuating means.

4. In a system of the character described, including a main tank, an auxiliary tank, a supply conduit and a drain conduit, of valve means for connecting the supply conduit at will through the main tank to the drain conduit or through the main and auxiliary tanks in series to the drain conduit, of a drain conduit leading from the auxiliary tank, a valve therefor and operating means for said valve adjusted by the further operation of the said first mentioned valve means for effecting the interconnection of the auxiliary tank with the drain conduit independent of the main tank.

5. In a water softening system of the character described, the combination with a main tank and an auxiliary tank, a valved supply conduit, a valved service conduit with which the supply conduit is normally connected through the main tank, a valved drain conduit with which the supply conduit may be connected at will through the main tank independent of the auxiliary tank and through the main and auxiliary tanks in series, a valved connection from the auxiliary tank to the drain conduit independently of the main tank, and a manually operable actuating member common to the valves controlling the respective supply service and drain connections, adapted when in one position of adjustment to effect operative interconnection of the main tank with the drain conduit, and upon further adjustment thereof to effect operative connection of the auxiliary tank with the drain conduit, independent of the main tank.

6. In an apparatus of the character described, the combination with a filter tank and a salt tank associated therewith, a supply conduit connectable directly with the filter tank and also through the salt tank to said filter tank, a service conduit leading from the filter tank, a drain conduit common to both the filter tank and the salt tank and independent valved connections between the said tanks and the drain conduit, and a common operating member for said independent valved connections.

7. In an apparatus of the character described, the combination with a filter tank having a supply conduit leading thereto, a service conduit leading therefrom and a waste conduit, of a salt tank having conduits leading thereto and from, connectable with the supply conduit and the filter tank, and a connection between the bottom of the salt tank and the waste conduit, and a manually operable control member common to all said connections.

8. In a water softening apparatus, a filter tank, an auxiliary tank, a supply conduit connectable with either of said tanks at will, said auxiliary tank being connectable with the filter tank, a service conduit leading from the filter tank, a waste conduit common to both the filter tank and auxiliary tank, and valve means for connecting the auxiliary tank with the waste conduit independent of the filter tank connection therewith, and common control means for said interconnections.

9. In a water softening apparatus of the character described, a filter tank, an auxiliary tank, a supply conduit connectable at will with either tank, a service conduit leading from the filter tank, and a waste conduit common to both tanks, valve means controlling the various interconnection of said conduits and tanks, a rotary control member therefor adapted by its movement to predetermined position to interconnect the auxiliary tank with the waste conduit through the filter tank and by further adjustment to interconnect the auxiliary tank directly with the waste tank independent of the filter tank.

In testimony whereof, I have hereunto set my hand this 25 day of June A. D. 1925.

EDWARD J. DE VILLE.